United States Patent [19]

Yazawa et al.

[11] 4,331,353
[45] May 25, 1982

[54] LOCK RELEASING DEVICE FOR LOCKS OF A FUEL OIL TANK LID AND A TRUNK LID OF A VEHICLE

[75] Inventors: Yasuhiro Yazawa, Yokohama; Kishiro Muroi, Sagamihara, both of Japan

[73] Assignee: Ohi Seisakusho Co. Ltd., Yokohama, Japan

[21] Appl. No.: 98,855

[22] Filed: Nov. 30, 1979

[30] Foreign Application Priority Data

Dec. 13, 1978 [JP] Japan .......................... 53-172011[U]

[51] Int. Cl.³ .......................... E05C 9/02; E05C 13/08
[52] U.S. Cl. .................................... 292/28; 292/336.3
[58] Field of Search .................. 292/28, 38, 50, 125, 292/171, 336.3

[56] References Cited

U.S. PATENT DOCUMENTS 2,090,638  8/1937  Romine .............................. 292/50 X
2,519,386  8/1950  Loving .............................. 292/38 X
2,529,361  11/1950 Abbas ............................. 292/171 X
3,924,427  12/1975 San Juaquin ..................... 292/171 X
4,054,307  10/1977 Carella et al. ......................... 292/50

Primary Examiner—Richard E. Moore
Attorney, Agent, or Firm—Holman & Stern

[57] ABSTRACT

A lock releasing device for a fuel tank lid and a trunk lid of a vehicle by a handle positioned beside a driver's seat, comprising first and second levers which are pivotally mounted to a base plate attached to a body of the vehicle and are so biased by spring means as one in one direction and the other in the opposite direction, and a push rod which pushes selectively the first or the second lever against the spring means so that the first or the second lever may release the locks directly or indirectly through pull wires connected therebetween. The handle is connected to the push rod via a push-pull wire. The locks are released by actuating the handle forwards or rearwards.

8 Claims, 7 Drawing Figures

LOCK RELEASING DEVICE FOR LOCKS OF A FUEL OIL TANK LID AND A TRUNK LID OF A VEHICLE

BACKGROUND OF THE INVENTION

1. Field of The Invention

This invention relates to lock releasing device for locks of a fuel tank lid and a trunk lid of a vehicle.

2. Description of The Prior Art

In the prior art, locks for a fuel tank lid and a trunk lid of a vehicle were adapted to be released by keys, and also by handles or levers arranged beside a driver seat in the vehicle. As shown in FIG. 1, in a handle box A two handles or levers B and C for releasing locks E and G of the fuel oil tank lid and the trunk lid, which are connected to the handles B and C via pull wires D and F, are pivotally mounted.

In such a case, however, since the two handles are mounted in the control box, a driver may be confused by the two handles when he wants to open the fuel tank lid or the trunk lid. Further, since the two unlocking devices coupled are provided, the constructions thereof are complicated, rather wasteful, and of high cost.

SUMMARY OF THE INVENTION

Therefore, it is an object of the present invention to provide an unlocking device for locks of a fuel tank lid and a trunk lid of a vehicle free from the abovementioned disadvantages, which are simple, convenient, and of low cost.

According to the present invention there is provided an unlocking device for locks of a fuel tank lid and a trunk lid of a vehicle, comprising: a base plate mounted to a body of the vehicle; first and second levers for releasing the locks, which are pivotally mounted to the base plate, and are so biased by spring means that each of said levers is biased in a direction opposite to the direction of movement of the other lever; an actuating rod which pushes selectively the first or the second lever against the spring means so that the first or the second lever may release the locks; and a handle for actuating the actuating rod via a push-pull wire connected therebetween, which is positioned beside a driver seat in the vehicle.

BRIEF DESCRIPTION OF THE DRAWINGS

The present invention will become more fully understood from the following description of a preferred embodiment thereof with reference to the accompanying drawings, in which.

DESCRIPTION OF THE PREFERRED EMBODIMENTS

In FIGS. 2–7, there is shown an unlocking device for locks of a fuel tank lid and a trunk lid of a vehicle.

Figure 1:
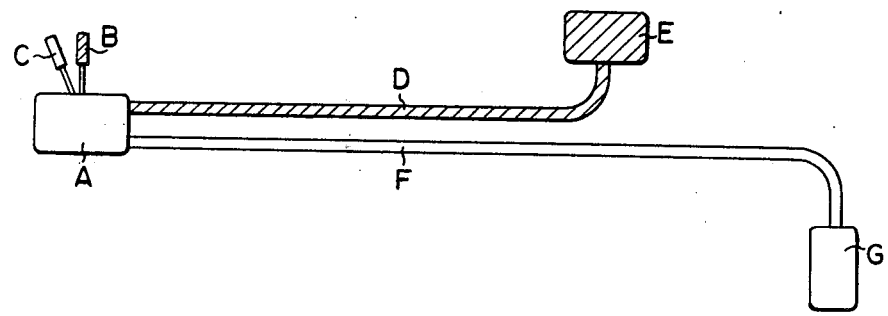
FIG. 1 is a schematic view of a conventional unlocking device.
Figure 2:
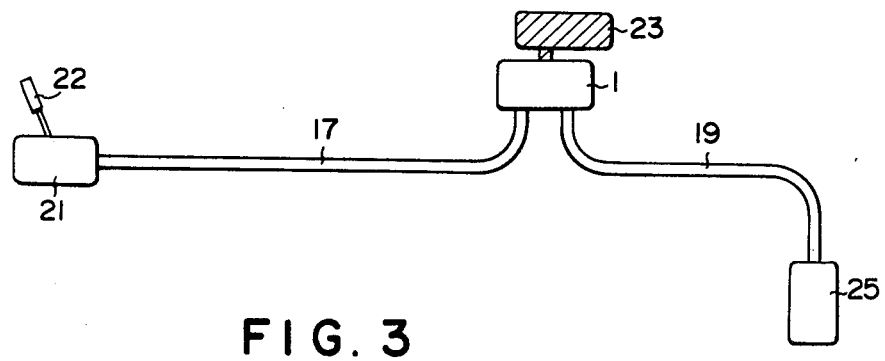
FIG. 2 is a schematic view of an unlocking device according to the present invention.
Figure 3:
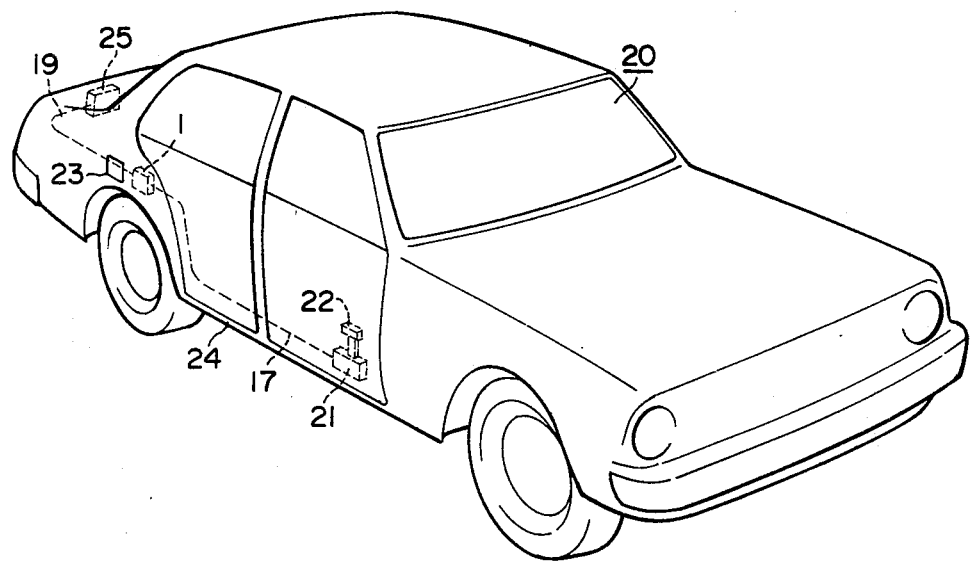
FIG. 3 shows a vehicle wherein an unlocking device of the present invention is provided.

In this embodiment, as shown in FIGS. 2 and 3, two locks for the fuel oil tank lid and the trunk lid of the vehicle are released by a handle, as described later.

Figure 4:
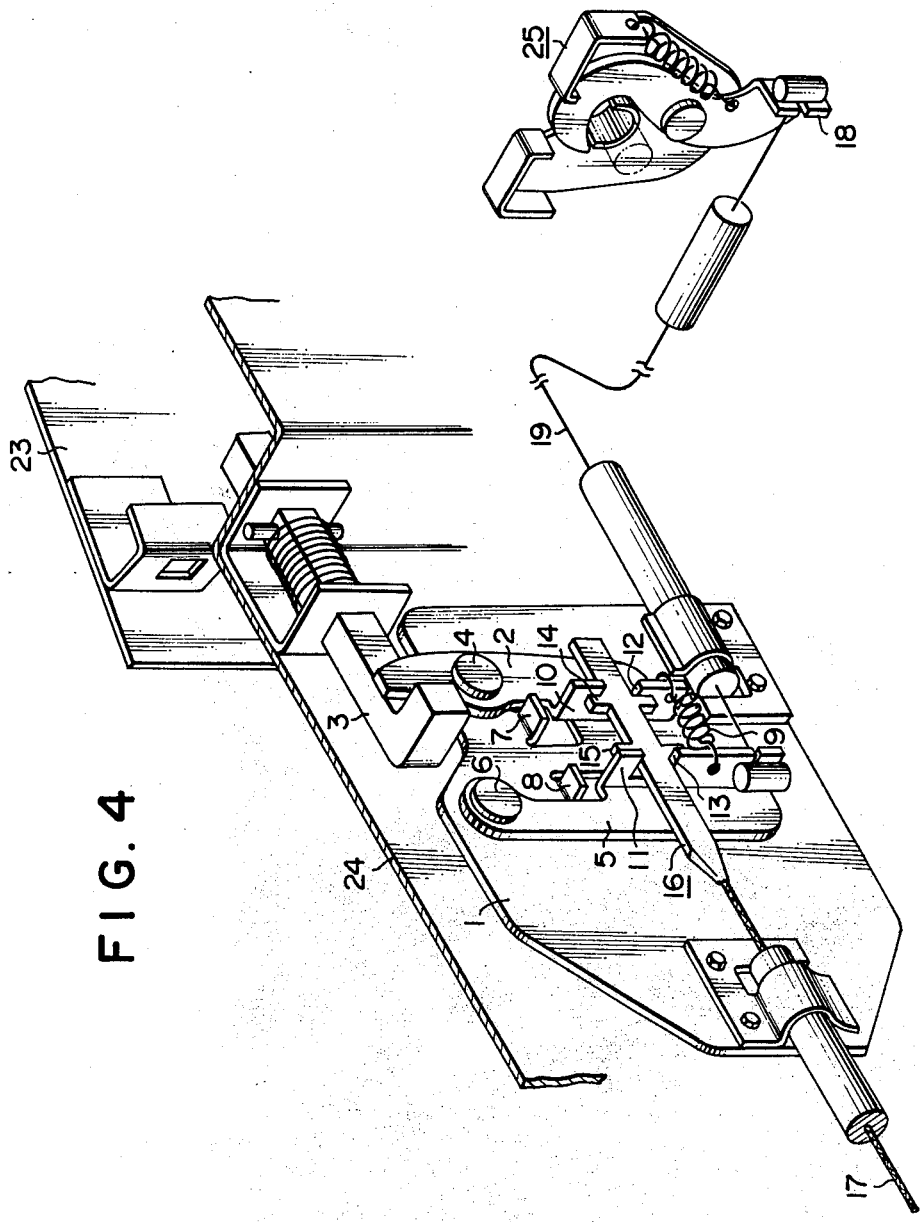
FIG. 4 is a perspective view of an unlocking device of the present invention.

In FIGS. 4–7, a vertical base plate 1 is mounted to the vehicle body 24 near a lock 23 of the fuel tank lid of the vehicle 20. A first lever 2 for releasing the lock 23 and a second lever 5 for releasing a lock 25 of a trunk lid are pivotally mounted vertically on the base plate 1 in their intermediate and top portions through shafts 4 and 6 mounted to the base plate 1 so that the upper part of the first lever 2 may pull out a locking lever 3 of the lock 23 against a spring therein when the lower part of the lever 2 is pushed toward the right, as shown in FIG. 4 by a push rod or actuating rod 16 arranged horizontally, and the lower part of the second lever 5 may pull a pull wire 19 connected to a locking lever 18 of the lock 25 against a spring located therein when the second lever 5 is pushed toward the left, as shown in FIG. 4 by the push rod 16.

A pair of first and second stop pieces 7 and 8 project from the base plate 1, perpendicular thereto, between the first and the second levers 2 and 5, and stop the pivot movements of the two levers 2 and 5 biased by a spring 9 coupling the two levers. The two levers 2 and 5 may be biased by another spring in another way, or by two springs independently.

The first and the second levers 2 and 5 include first and second guide pieces 10 and 11, each having a first or second guide groove 12 or 13, which face each other and project from the sides of the two levers 2 and 5 perpendicular to the base plate 1. In this embodiment, the guide pieces 10 and 11 are coupled by the spring 9, and the pull wire 19 for the lock 25 is connected to the lower end portion of the second guide piece 11. The push rod 16 having pairs of first and second projections 14 and 15 which project vertically adjacent to the first and the second guide pieces 10 and 11 between them, is arranged in the guide grooves 12 and 13.

One end of the actuating rod 16 is connected to one end of a push-pull wire or cable 17 the other end of which is connected to an control 22 in a handle box 21 positioned beside a driver's seat in the vehicle 20, as clearly shown in FIGS. 2 and 3. The handle 22 is adapted to push or pull the cable 17 when it is pivoted forwards or rearwards.

Figure 5:
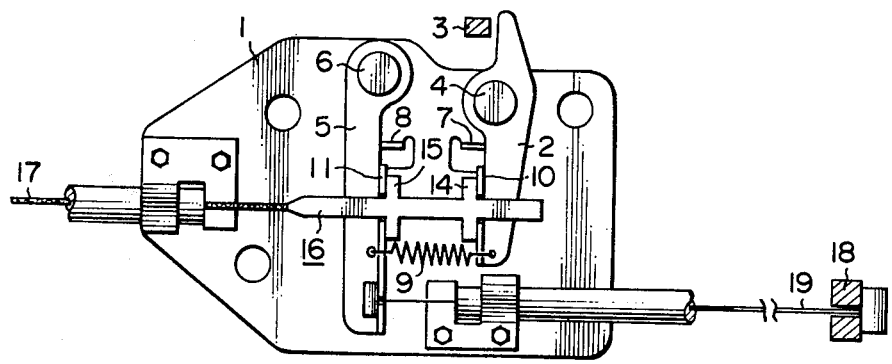
FIG. 5 is a side view of the unlocking device of FIG. 4, when it is in the neutral or non-actuated position.
Figure 6:
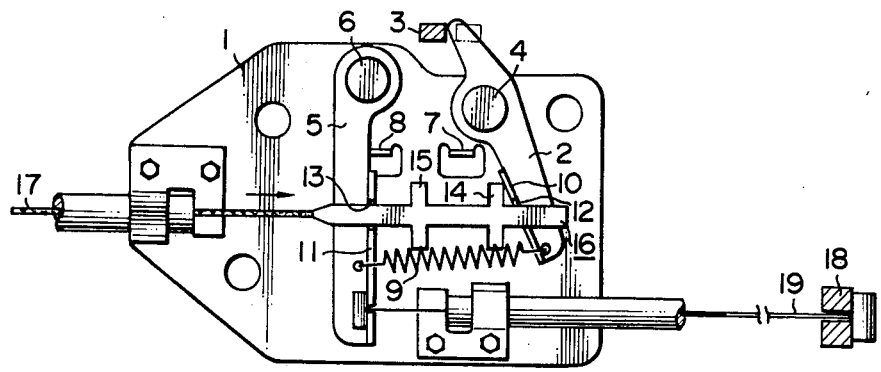
FIG. 6 is a side view of the unlocking device of FIG. 4, when a fuel tank lid lock is released.

Now, when the handle 22 is pivoted forwards, the push-pull wire 17 pushes the actuating rod 16 from the neutral or non-actuated position shown toward FIGS. 4 and 5, in the right, as shown in FIGS. 4–7, and the first projections 14 of the push rod 16 push the first guide piece 10. Thus, the first lever 2 is pivoted counterclockwise against the spring 9, and pulls the locking lever 3 against the spring, as shown in FIG. 6, thereby releasing the lock 23 of the fuel tank lid.

Figure 7:
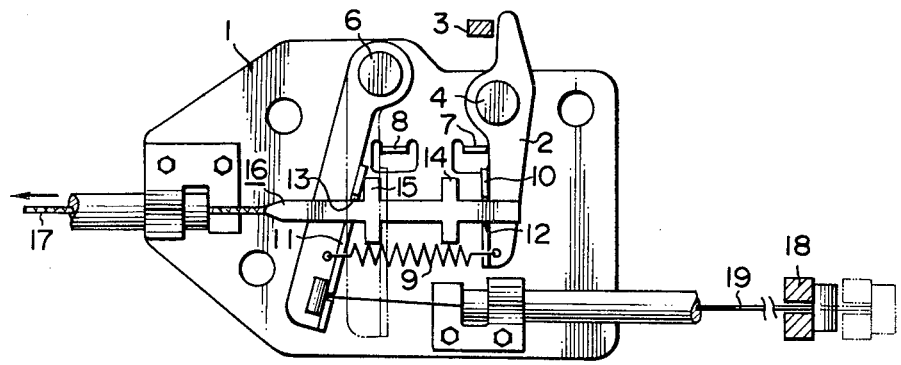
FIG. 7 is a side view of the unlocking device of FIG. 4, when a trunk lid lock is released.

On the other hand, when the handle 22 is pivoted rearwards, the cable 17 pulls the actuating rod 16 from the neutral or non-actuated position in the left hand side direction in FIGS. 4–7, and the second projections 15 of the actuating rod 16 push the second guide piece 11. Then, the second lever 5 is pivoted clockwise against the spring 9, and pulls the pull wire 19 and the locking lever 18 connected thereto, as shown in FIG. 7, thereby releasing the lock 25 of the trunk lid.

In the embodiment described above, the first lever 2 actuates directly the locking lever 3 of the lock 23 of the fuel tank lid, but, of course, the first lever 2 can indirectly actuate the locking lever 3 through a coupling means such as a pull wire in the same manner as the lock 25. In this case, the unlocking device on the present invention may conveniently be mounted any position of the body in the vehicle.

Although the present invention has been shown and described in terms of a preferred embodiment thereof, various changes and modifications can be made by those skilled in the art without departing from the scope of the present invention.

What is claimed is:

1. A lock releasing device for alternately releasing the locks of a fuel tank lid and a trunk lid of a vehicle, comprising:
   a base plate mounted to a body of the vehicle;
   a first lever for releasing the first of said locks and a second lever for releasing the second of said locks, each of said levers are pivotally mounted to the base plate;
   means for biasing each of said levers in a direction opposite to the direction of movement of the other lever;
   an actuating rod which pushes selectively the first lever or the second lever against the biasing means so that the first lever releases the first lock or the second lever releases the second lock; and
   a handle for actuating the actuating rod via a cable connected therebetween, which is positioned beside a driver's seat in the vehicle.

2. A device as claimed in claim 1, wherein the first lever directly engages said first lock, and the second lever is attached to a pull wire, the other end of said pull wire being connected to said second lock.

3. A device as claimed in claim 1, wherein the first and the second levers are each attached to pull wires, the other ends of each pull wire being connected to the first and second locks, respectively.

4. A device as claimed in claim 2 or 3, wherein the first and the second levers are arranged substantially in parallel in the neutral position.

5. A device as claimed in claim 4, wherein the first and the second levers include first and second guide pieces, each having a groove, the first guide piece being attached to a side of the first lever and the second guide piece being attached to a side of the second lever, each of said guide pieces projecting from the sides of the two levers and disposed perpendicular to the base plate and in facing relationship to each other, said actuating rod being arranged within the grooves of said levers and having pairs of first and second projections which project parallel to the levers and are positioned adjacent to and between the first and second guide pieces.

6. A device as claimed in claim 5, wherein the movement of the first and the second levers when biased is limited by stop pieces mounted to the base plate between the two levers.

7. A device as claimed in claim 1, wherein said biasing means comprises at least one spring.

8. A device as claimed in claim 7, wherein said at least one spring is a spring attached to both of said levers.

* * * * *